(12) United States Patent
Miszewski et al.

(10) Patent No.: US 6,762,601 B2
(45) Date of Patent: Jul. 13, 2004

(54) NON-INVASIVE DETECTORS FOR WELLS

(75) Inventors: Antoni Miszewski, Budleigh Salterton (GB); Simon Duckett, Cullompton (GB)

(73) Assignee: Antech Limited, Exeter (GB)

( * ) Notice: Subject to any disclaimer, the term of this patent is extended or adjusted under 35 U.S.C. 154(b) by 21 days.

(21) Appl. No.: 10/321,824

(22) Filed: Dec. 17, 2002

(65) Prior Publication Data

US 2003/0117133 A1 Jun. 26, 2003

(30) Foreign Application Priority Data

Dec. 20, 2001 (GB) .............................................. 0130549

(51) Int. Cl.$^7$ .......................... G01B 7/14; G01R 22/00; G01R 19/04
(52) U.S. Cl. ............. 324/207.26; 324/221; 324/207.18; 324/103 P; 324/76.17; 166/66.5
(58) Field of Search ........................... 324/207.26, 206, 324/220, 221, 76.17, 117 R, 103 P, 123 C, 207.18; 166/66.5, 255.1

(56) References Cited

U.S. PATENT DOCUMENTS

| | | | | |
|---|---|---|---|---|
| 3,525,040 A | * | 8/1970 | Rolfe | ..................... 324/103 R |
| 3,644,825 A | * | 2/1972 | Davis et al. | ............ 324/207.26 |
| 3,843,922 A | * | 10/1974 | Mead | .......................... 323/226 |
| 3,863,235 A | * | 1/1975 | McKee et al. | ......... 340/870.31 |
| 4,308,497 A | * | 12/1981 | Rodgers | .................. 324/103 P |
| 4,472,680 A | | 9/1984 | Wellington | .................. 324/221 |
| 4,859,941 A | | 8/1989 | Higgs et al. | .............. 324/207.2 |
| 6,084,403 A | * | 7/2000 | Sinclair et al. | .............. 324/221 |

FOREIGN PATENT DOCUMENTS

| | | |
|---|---|---|
| GB | 1 602 065 | 11/1981 |
| GB | 2 306 657 | 5/1997 |

* cited by examiner

Primary Examiner—Anjan K. Deb
(74) Attorney, Agent, or Firm—Herbert Dubno

(57) ABSTRACT

Detector circuitry for detecting magnetic field disturbances resulting from the movement of equipment through a pipe of magnetic material, the detector circuitry comprising a difference circuit fed with the outputs of two longitudinally spaced sensor means via respective DC blocking means, a saturating difference amplifier feeding an integrator and fed with the outputs of the difference circuit and the integrator, and indicating means fed from the integrator. The detector circuitry may also including level setting means and a comparator fed with the outputs of the integrator and the level setting means and feeding the indicating means. A second comparator may be connected in parallel with the first comparator and fed with the inverse of the output of the level setting means and the output of the integrator.

5 Claims, 1 Drawing Sheet

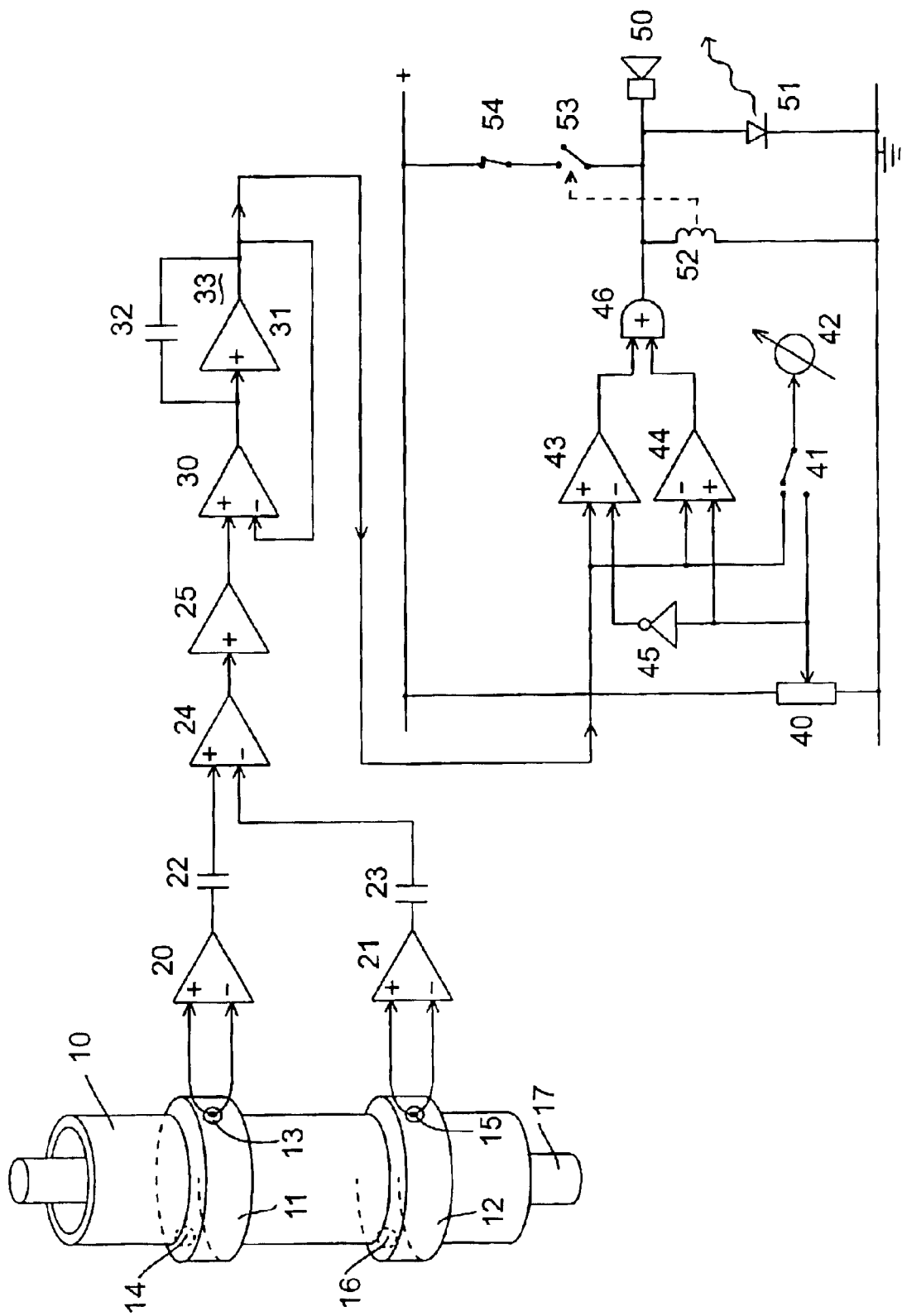

NON-INVASIVE DETECTORS FOR WELLS

FIELD OF THE INVENTION

The present invention relates to non-invasive detectors for detecting the presence of pieces of equipment through the walls of pipes, particularly steel pipes, typically pipes that are used in oil wells and the like. More specifically, it relates to the circuitry of such detectors.

BACKGROUND OF THE INVENTION

In the oil industry, it is common to retain moving equipment inside a pressure vessel. An example is a downhole instrument which is retrieved from a well through a riser. The problem is that the pressure vessel forming the top of the riser is usually made of steel, and this stops the operator of the equipment from seeing what is going on because he cannot see through steel. Accordingly, some sort of sensor is required, so that the equipment operator can detect what is going on inside the pressure vessel without having to open it. This has safety benefits because it may prevent an accident and it has operational benefits because it may allow the operator to position equipment more accurately.

Various sensing devices have been proposed. The traditional sensing device is a sensing coil which encircles the riser, and detects magnets attached to equipment which may be passing up or down the well. As an alternative to sensing coils, other sensing devices can be used. Thus U.S. Pat. No. 5,323,856 (Halliburton) suggests a variety of detectors, such as the use of Hall effect, fiber optic, or Faraday effect detectors.

U.S. Pat. No. 3,843,923 (Stewart & Stevenson) is a more detailed example of the use of Hall effect devices. To detect the movement of a pipe joint through a pipe, a locator comprises a ring magnet with a pair of detector rings mounted one on each side (ie one above the ring magnet and one below it). Each detector ring comprises a set of four Hall effect devices mounted around the pipe. The Hall effect devices of a set have their outputs summed, and the sums of the two sets are differenced.

Further, our own earlier GB patent application no. 01.22431.0 (filed Sep. 17, 2001) describes the use of two pairs of Hall effect devices, one pair being located opposite each other on the riser and the other pair being similarly located opposite each other and longitudinally below the first pair. This patent application notes that with sufficient sensitivity, devices can be detected passing through the well even though they do not have magnets attached to or incorporated in them, provided that they use magnetizable material and their passage produces a sufficient change in the ambient magnetic field (ie the field due to drilling rig steelwork, the earth's field, etc).

OBJECT OF THE INVENTION

The general object of the present invention is to provide improved detector circuitry suitable for use with oil well pipes and risers.

BRIEF SUMMARY OF THE INVENTION

According to the invention, there is provided detector circuitry for detecting magnetic field disturbances resulting from the movement of equipment through a pipe of magnetic material, the detector circuitry comprising a difference circuit fed with the outputs of two longitudinally spaced sensor means via respective DC blocking means, a saturating difference amplifier feeding an integrator and fed with the outputs of the difference circuit and the integrator, and indicating means fed from the integrator.

It may also be desirable for the sensor electronics to incorporate a threshold level setting. This can be used as a comparator signal to give a warning when a change in signal level is detected. Also, by having a threshold level that can be adjusted, it is possible to avoid detections that may result from sensor or system noise. A second comparator may be connected in parallel with the first and fed with inverse or reversed inputs, so that signals of both polarities can be detected. The indicating means may include matching means.

BRIEF DESCRIPTION OF THE DRAWING

Detector circuitry embodying the invention will now be described, by way of example only and not intending to be limiting, with reference to the drawing, which is a block diagram of the circuitry.

DESCRIPTION OF THE PREFERRED EMBODIMENT

Referring to the drawing, a well head riser 10 has attached to it two sensor assemblies 11 and 12 which are spaced apart vertically as shown. Sensor assembly 11 has a sensor 13; sensor assembly 12 has a sensors 15. Each sensor is preferably a Hall effect, having a pair of outputs across which the output signal appears. The outputs of each sensors are fed to respective difference amplifiers 20 and 21 as shown.

Generally, the equipment to be detected will be mounted on a continuous tubing 17 passing through the pipe or riser 10, and this tubing will have an effect on the sensors. In particular, if the tubing moves from side to side in the pipe, so that its distance from the sensors varies, that will induce a signal from the sensors. The use of two sensors spaced longitudinally along the pipe results in similar signals from both sensors. As discussed below, the signals from the two sensor assemblies are differenced; this effectively cancels out such signals, so that the system is insensitive to transverse oscillations of the tubing.

If desired, each sensor assembly 11 and 12 can include a plurality of sensors, such as two sensors 13 and 14 in sensor assembly 11 and two sensors 15 and 16 in sensor assembly 12. The sensors in each sensor assembly are equally spaced around the assembly. This is desirable if the diameter of the pipe is large relative to the diameter of the tubing 17, so that transverse movement of the tubing can produce large variations in signal level. With the use of a plurality of sensors in each assembly, movement of the tubing away from one sensor will bring it nearer to the opposite sensor. The outputs of the sensors are summed, producing a more consistent signal level from any equipment attached to the tubing.

The two summing amplifiers 20 and 21 feed respective DC blocking circuits (capacitors) 22 and 23, which in turn feed a difference amplifier 24, the output of which is further amplified by an amplifier 25. The capacitors 22 and 23 act as high pass filters, removing the effects of static signals and long-term slow drift.

The amplifier 24 feeds a comparator 30 which feeds an integrator circuit 33 comprising an amplifier 31 with a capacitor 32 connected across it as shown. The output of the integrator 33 is fed back to the other input of the difference amplifier 30. This feedback results in the long-term output of the integrator matching the steady-state output of amplifier 24, so producing a neutral or zero output from the amplifier

30. Any long-term offset of the amplifier 24 is thus automatically compensated for.

If equipment producing a magnetic field change passes the sensor assemblies, the output of amplifier 24 will change significantly. This will drive the output of amplifier 30 to its limit. The integrator 33 will ramp up for as long as the output of amplifier 24 lasts. The integrator thus effectively measures the length of the signal produced by the equipment in the pipe. Short pulses, resulting from noise, etc will effectively be ignored.

The integrator 33 feeds a switch 41 which is also fed with an adjustable reference level from a level setting circuit 40. A meter 42 can be connected, by means of the switch, to either the output of the integrator 33 or the level setting circuit 40 to allow the level set by the level setting circuit 40 and the output of the integrator 33 to be measured.

The integrator circuit 33 also feeds a difference amplifier 43 which is also fed with the output of an adjustable level setting circuit 40. Amplifier 43 feeds (via an OR gate 46) an audio alarm 50 and a visual LED alarm 51, which both operate when the output of amplifier 43 goes positive, ie when the output of the integrator 33 exceeds the level set by the level setting circuit 40.

The OR gate 46 also feeds a relay latching circuit. A relay coil 52, fed by the OR gate, controls a relay contact 53, which, when it closes, holds the relay on. The audio and visual alarms are therefore latched on. A switch 54 can be opened by the operator to release the relay latch.

A second difference amplifier 44 is also fed, in the reverse senses, with the output of integrator circuit 33 and the output of the level setting circuit 40 via an inverter 45. The amplifiers 43 and 44 both feed an OR gate 46. The circuitry is therefore sensitive to both positive and negative signals from the sensors 13 and 15. A negative signal drives the integrator negatively, and if the signal is long enough, the integrator output will operate the alarms via the difference amplifier 44.

As an alternative, the outputs of the difference amplifiers 43 and 44 can be processed to detect signals of opposite polarity occurring with an appropriate time interval between them. This technique will detect the passage of equipment past the two sensor assemblies in succession, which will occur if the tubing 17 is being withdrawn from the well at a suitable speed, carrying the equipment with it.

The present arrangement of sensors allows the signals from the sensors (eg 13 and 15) that are longitudinally spaced along the pipe to be subtracted from each other in the signal processing. This serves to enhance the response that is detected as the equipment passes inside the pipe. Further, in larger pipe systems, the signals detected by the different sensors with the equipment in a different radial position in the riser 10 may vary significantly. The use of a plurality of sensors in each sensor assembly allows the signals from all the sensors at the same level around the outer pipe (eg sensors 13 and 14) to be added together to compensate for this effect.

The present detector circuit thus detects, with high efficiency, the magnetic field changes that occur when equipment moves inside the pressure vessel. In some cases it may be possible to put a magnetic marker of the enclosed equipment. In other cases, detection may have to be achieved using the residual magnetic field of the enclosed equipment. The technique can tolerate significant background magnetic fields that can occur on large metal structures such as oil rigs.

Alternative embodiments using the principles disclosed will suggest themselves to those skilled in the art upon studying the foregoing description and the drawings. It is intended that such alternatives are included within the scope of the invention, the scope of the invention being limited only by the claims.

We claim:

1. Detector circuitry for detecting magnetic field disturbances resulting from the movement of equipment through a pipe of magnetic material, the detector circuitry comprising a difference circuit fed with the outputs of two longitudinally spaced sensor means via respective DC blocking means, a saturating difference amplifier feeding an integrator and fed with the outputs of the difference circuit and the integrator, and indicating means fed from the integrator.

2. Detector circuitry according to claim 1 including level setting means and a comparator fed with the outputs of the integrator and the level setting means and feeding the indicating means.

3. Detector circuitry according to claim 2 including a second comparator connected in parallel with the first comparator and fed with the inverse of the output of the level setting means and the output of the integrator.

4. Detector circuitry according to claim 2 including latching circuitry fed from the comparator.

5. Detector circuitry according to claim 2 including meter means connectable to the level setting means and the integrator via switch means.

\* \* \* \* \*